US012670768B2

United States Patent
(12) United States Patent
Bouvier et al.

(10) Patent No.: US 12,670,768 B2
(45) Date of Patent: Jun. 30, 2026

(54) GAMING SYSTEM AND METHOD WITH MULTI-PLAY NUDGE FEATURE

(71) Applicant: LNW Gaming, Inc., Las Vegas, NV (US)

(72) Inventors: George Bouvier, Henderson, NV (US); Gregory Carr, Las Vegas, NV (US); Kimberly Cohn, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 177 days.

(21) Appl. No.: 18/731,751

(22) Filed: Jun. 3, 2024

(65) Prior Publication Data

US 2025/0037546 A1 Jan. 30, 2025

Related U.S. Application Data

(60) Provisional application No. 63/515,482, filed on Jul. 25, 2023.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ... G07F 17/3267; G07F 17/3213; G07F 17/34
See application file for complete search history.

(56) References Cited

U.S. PATENT DOCUMENTS

| | | | | |
|---|---|---|---|---|
| 6,186,894 | B1 * | 2/2001 | Mayeroff | G07F 17/34 463/16 |
| 6,676,512 | B2 | 1/2004 | Fong et al. | |
| 6,811,486 | B1 | 11/2004 | Luciano, Jr. | |
| 7,371,173 | B2 | 5/2008 | Gatto et al. | |
| 7,997,979 | B2 | 8/2011 | Gatto et al. | |
| 8,033,904 | B2 | 10/2011 | Gatto et al. | |
| 8,197,329 | B2 | 6/2012 | Englman et al. | |
| 8,388,435 | B2 | 3/2013 | Anderson et al. | |
| 8,550,899 | B2 | 10/2013 | Hornik et al. | |
| 8,608,544 | B2 | 12/2013 | Aoki et al. | |
| 8,678,910 | B2 | 3/2014 | Englman et al. | |
| 9,251,670 | B2 | 2/2016 | Aoki et al. | |
| 9,542,794 | B2 | 1/2017 | Englman et al. | |

(Continued)

FOREIGN PATENT DOCUMENTS

| | | | |
|---|---|---|---|
| GB | 2092797 | A | 8/1982 |
| GB | 2097160 | A | 10/1982 |

(Continued)

*Primary Examiner* — Peter J Iannuzzi

(57) ABSTRACT

There are provided a gaming machine and method that utilize game-logic circuitry and a presentation assembly configured to display a plurality of sets of symbol-bearing reels. The plurality of reel sets are spun and stopped to populate respective arrays with symbols from the respective reel sets. The populated arrays represent respective symbol outcomes. In response to a triggering event, the game-logic circuitry conducts a nudge feature by nudging one or more reels of any of the reel sets that populated its respective array with a losing symbol outcome to convert the losing symbol outcome to a winning symbol outcome.

10 Claims, 4 Drawing Sheets

(56) References Cited

U.S. PATENT DOCUMENTS

| | | | | |
|---|---|---|---|---|
| 9,542,814 | B2 | 1/2017 | Daniels | |
| 9,846,995 | B2 | 12/2017 | Gomez et al. | |
| 10,665,053 | B2 * | 5/2020 | Chesworth | G07F 17/3244 |
| 10,810,827 | B2 * | 10/2020 | Grace | G07F 17/3267 |
| 2004/0204228 | A1 * | 10/2004 | Walker | G07F 17/3244 463/20 |
| 2020/0074784 | A1 * | 3/2020 | Caputo | G07F 17/3213 |
| 2021/0350678 | A1 * | 11/2021 | Warms | G07F 17/3267 |
| 2022/0084352 | A1 * | 3/2022 | Ludwick | G07F 17/3267 |

FOREIGN PATENT DOCUMENTS

| | | | |
|---|---|---|---|
| GB | 2117952 | A | 10/1983 |
| GB | 2144568 | A | 3/1985 |
| GB | 2165385 | A | 4/1986 |
| GB | 2165386 | A | 4/1986 |
| GB | 2180087 | A | 3/1987 |
| GB | 2181589 | A | 4/1987 |
| GB | 2183882 | A | 6/1987 |
| GB | 2190227 | A | 11/1987 |
| GB | 2192478 | A | 1/1988 |
| GB | 2194093 | A | 2/1988 |
| GB | 2201279 | A | 8/1988 |
| GB | 2204436 | A | 11/1988 |
| GB | 2205188 | A | 11/1988 |
| GB | 2210191 | A | 6/1989 |
| GB | 2222712 | A | 3/1990 |
| GB | 2225889 | A | 6/1990 |
| GB | 2226436 | A | 6/1990 |
| GB | 2230373 | A | 10/1990 |
| GB | 2242300 | A | 9/1991 |
| GB | 2242572 | A | 10/1991 |
| GB | 2250849 | A | 6/1992 |
| GB | 2251112 | A | 6/1992 |
| GB | 2252439 | A | 8/1992 |
| GB | 2253300 | A | 9/1992 |
| GB | 2253931 | A | 9/1992 |
| GB | 2268415 | A | 1/1994 |
| GB | 2269039 | A | 1/1994 |
| GB | 2270005 | A | 3/1994 |
| GB | 2278007 | A | 11/1994 |
| GB | 2287567 | A | 9/1995 |
| GB | 2319389 | A | 5/1998 |
| GB | 2322217 | A | 8/1998 |
| GB | 2326505 | A | 12/1998 |
| GB | 2326506 | A | 12/1998 |
| GB | 2326514 | A | 12/1998 |
| GB | 2328311 | A | 2/1999 |
| GB | 2333880 | A | 8/1999 |
| GB | 2338813 | A | 12/1999 |
| GB | 2358728 | A | 8/2001 |
| GB | 2372132 | A | 8/2002 |
| GB | 2382447 | A | 5/2003 |
| GB | 2382911 | A | 6/2003 |
| GB | 2372132 | B | 8/2004 |
| GB | 2382911 | B | 12/2004 |
| GB | 2405190 | A | 2/2005 |
| GB | 2427298 | A | 12/2006 |
| GB | 2435709 | A | 9/2007 |
| GB | 2460183 | A | 11/2009 |
| GB | 2461343 | A | 1/2010 |
| GB | 2466986 | A | 7/2010 |
| GB | 2338813 | B | 10/2022 |

* cited by examiner

GAMING SYSTEM AND METHOD WITH MULTI-PLAY NUDGE FEATURE

RELATED APPLICATIONS

This patent application claims the benefit of U.S. Provisional Patent Application No. 63/515,482 filed Jul. 25, 2023, which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023-2024 LNW Gaming, Inc.

FIELD OF THE INVENTION

The present invention relates to a technological improvement to gaming systems, gaming machines, and methods and, more particularly, to technological improvements in connection with a multi-play nudge feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple game features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to embodiments of the present invention, there are provided a gaming machine and method that utilize game-logic circuitry and a presentation assembly configured to display a plurality of sets of symbol-bearing reels. The plurality of reel sets are spun and stopped to populate respective arrays with symbols from the respective reel sets. The populated arrays represent respective symbol outcomes. In response to a triggering event, the game-logic circuitry conducts a nudge feature by nudging one or more reels of any of the reel sets that populated its respective array with a losing symbol outcome to convert the losing symbol outcome to a winning symbol outcome.

Additional aspects of the invention will be apparent to those of ordinary skill in the art in view of the detailed description of various embodiments, which is made with reference to the drawings, a brief description of which is provided below.

Figure 1:
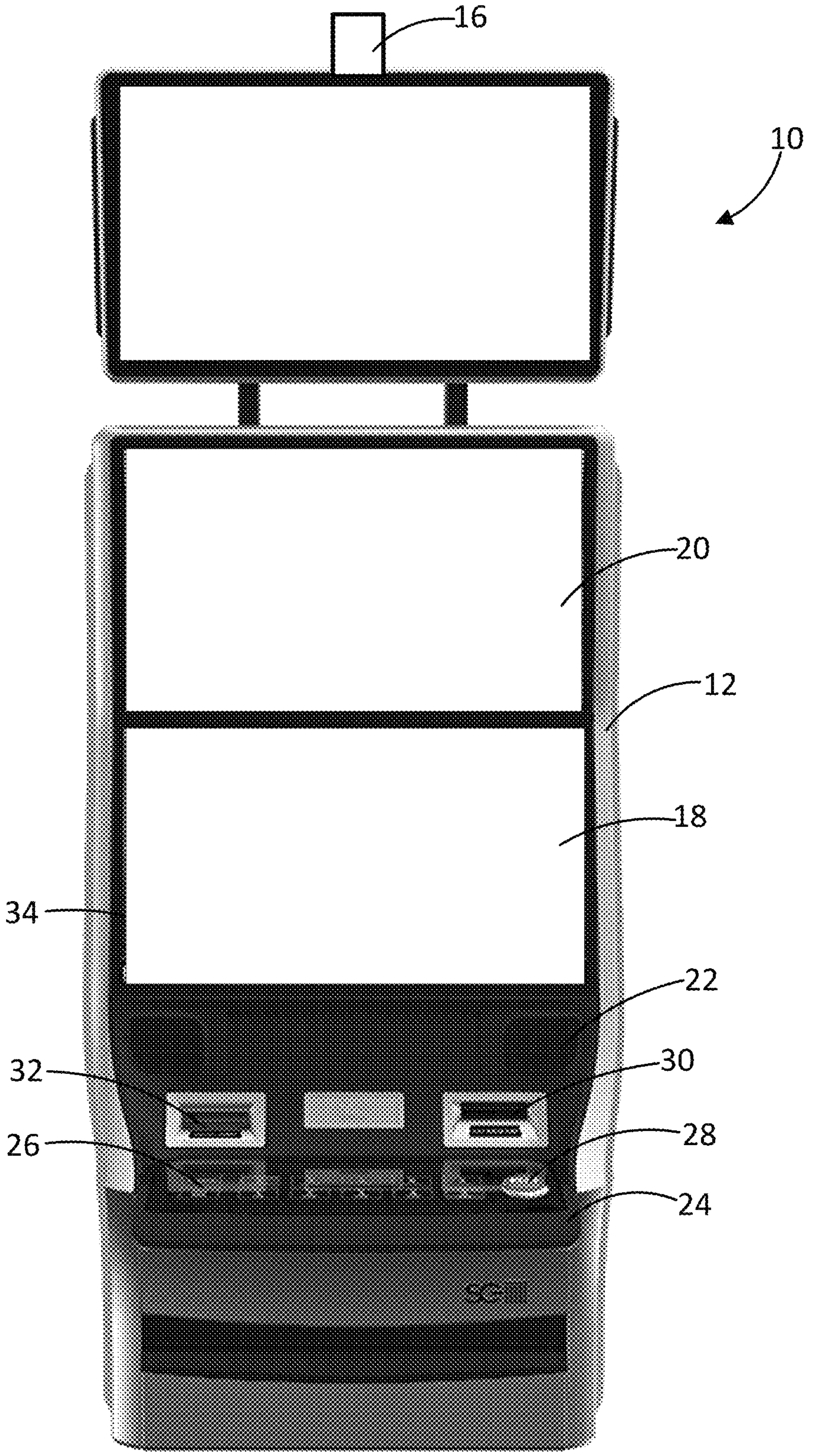
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots with physical symbol-bearing reels, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) mounted over the primary or secondary presentation devices, an input deck 24 supporting a video button panel 26 bearing touch keys and one or more mechanical push-buttons 28, a bill/ticket acceptor 30, a card reader/writer (not shown), a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen, video button panel 26, push-buttons 28, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a monetary balance on a credit meter such as the "credit" meter 34. The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 30, a card reader/writer (not shown), a wireless communication interface for reading cash or credit data from a nearby mobile device, and a network interface for withdrawing cash or credits from a remote account via an electronic funds transfer. In response to a cashout input that initiates a payout from the monetary balance on the "credit" meter 34, the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, a card reader/writer, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
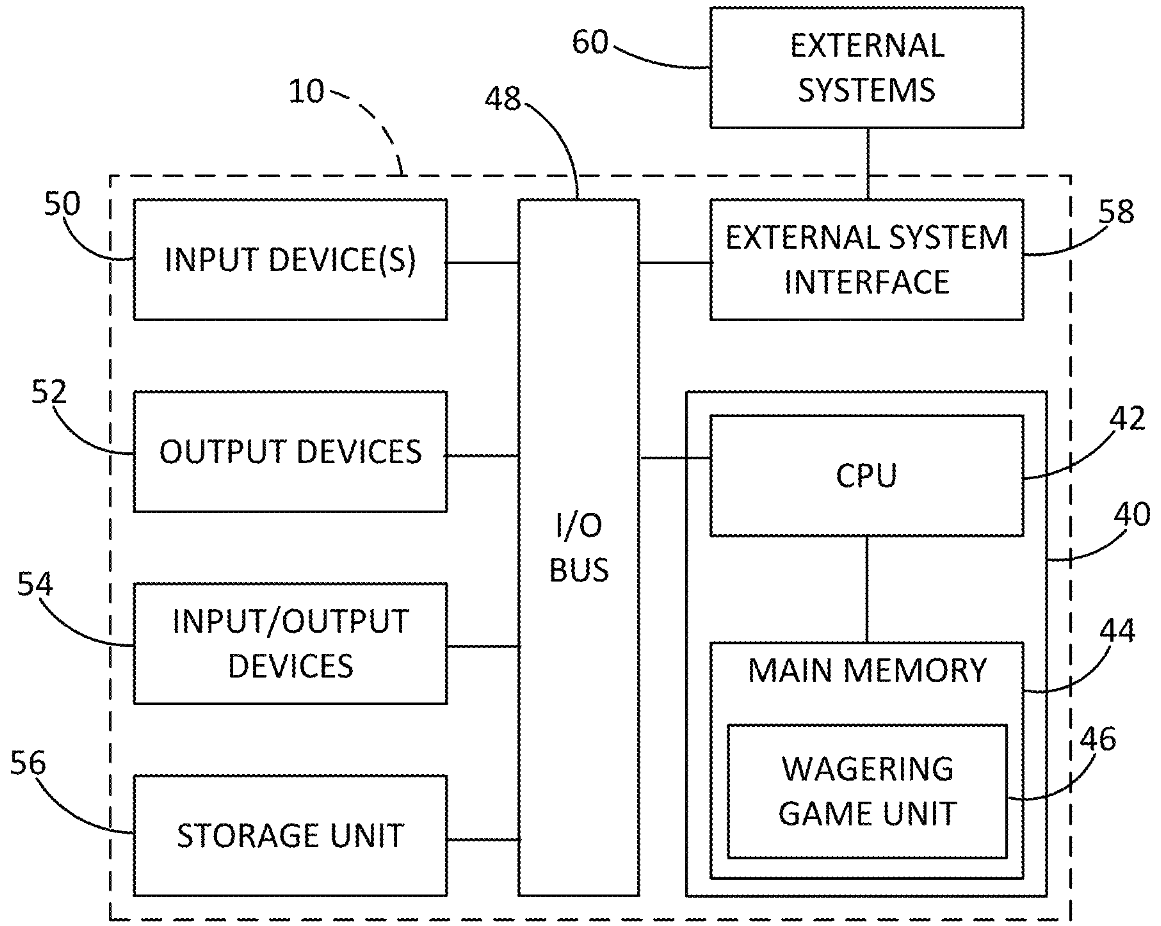
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3:
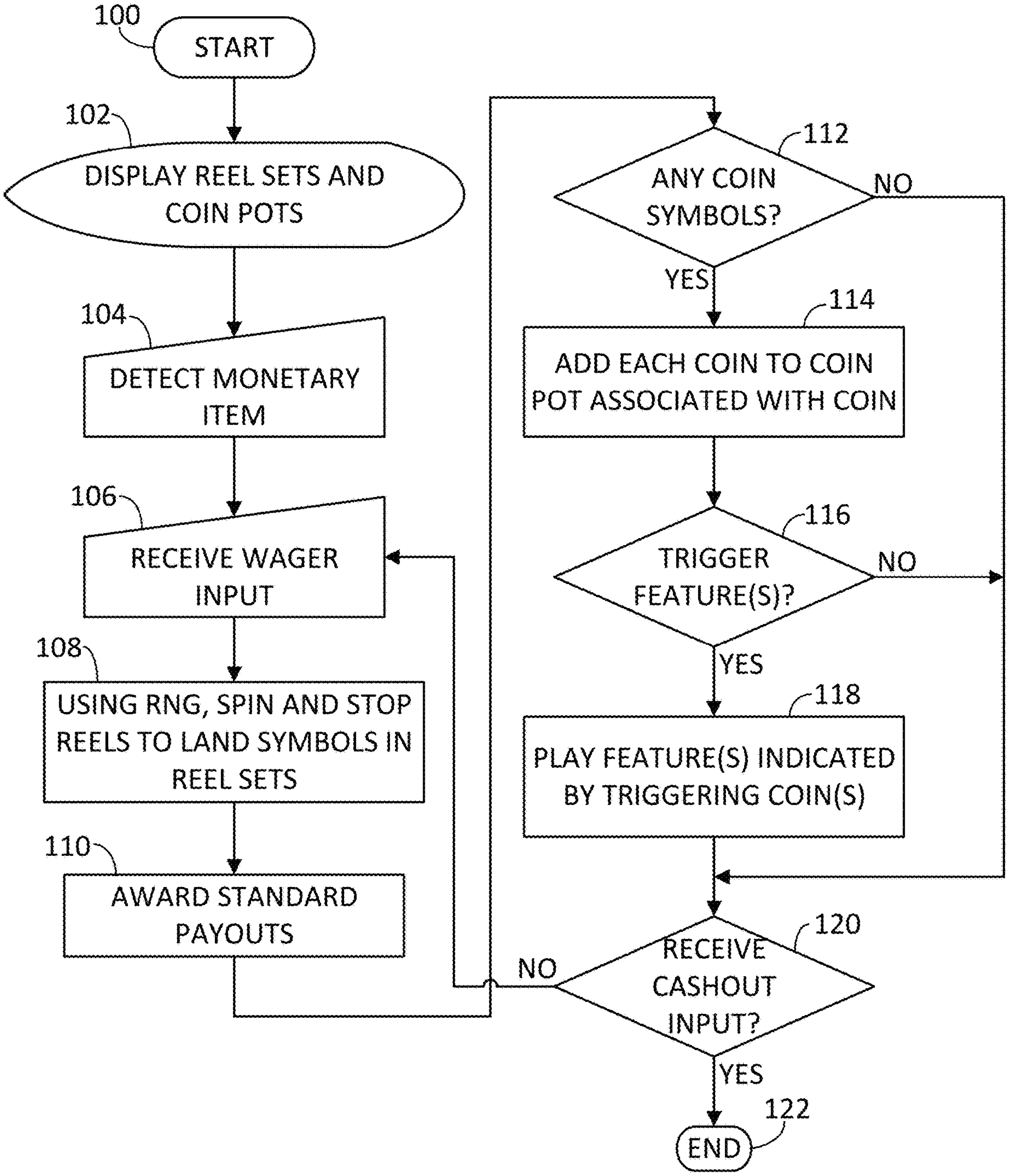
FIG. 3 is a flow diagram for a data processing method that corresponds to instructions executed by a controller, according to an embodiment of the present invention.

Referring now to FIG. 3, there is shown a flow diagram representing one data processing method corresponding to at least some instructions stored and executed by the game-logic circuitry 40 in FIG. 2 to perform operations according to an embodiment of the present invention. The data processing method is described below in connection with the exemplary presentations of initial and modified spin outcomes in FIGS. 4 and 5, respectively.

Referring to FIG. 3, the data processing method commences at step 100. At step 102, the game-logic circuitry controls one or more presentation devices (e.g., mechanical-reel display device, video display device, or a combination thereof) to present a plurality of sets of symbol-bearing reels and a plurality of feature-triggering perceived persistent elements (e.g., coin pots). Although the method is described with respect to one presentation device, it is to be understood that the presentation described herein may be performed by a presentation assembly including more than one presentation device. The number of reel sets is at least two and, in one embodiment, is at least five and preferably ten. Each reel set populates a respective array of symbol positions. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. Alternatively, the symbol positions may be arranged in a honeycomb configuration with adjacent columns vertically offset from each other by one-half symbol position or adjacent rows horizontally offset from each other by one-half symbol position. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In some embodiments, the reels are associated with respective individual symbol positions of the array such that each reel animates in place and populates only its respective symbol position. The symbol array configuration may vary between the base game and any bonus games and/or other game features utilizing the array.

Figure 4:
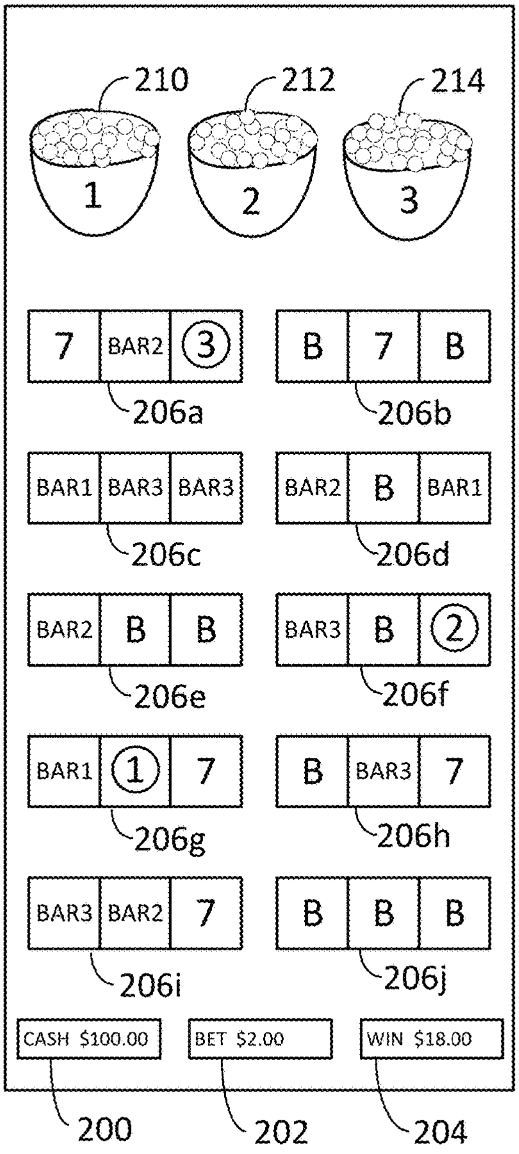
FIG. 4 is an exemplary presentation of an initial spin outcome.
Figure 5:
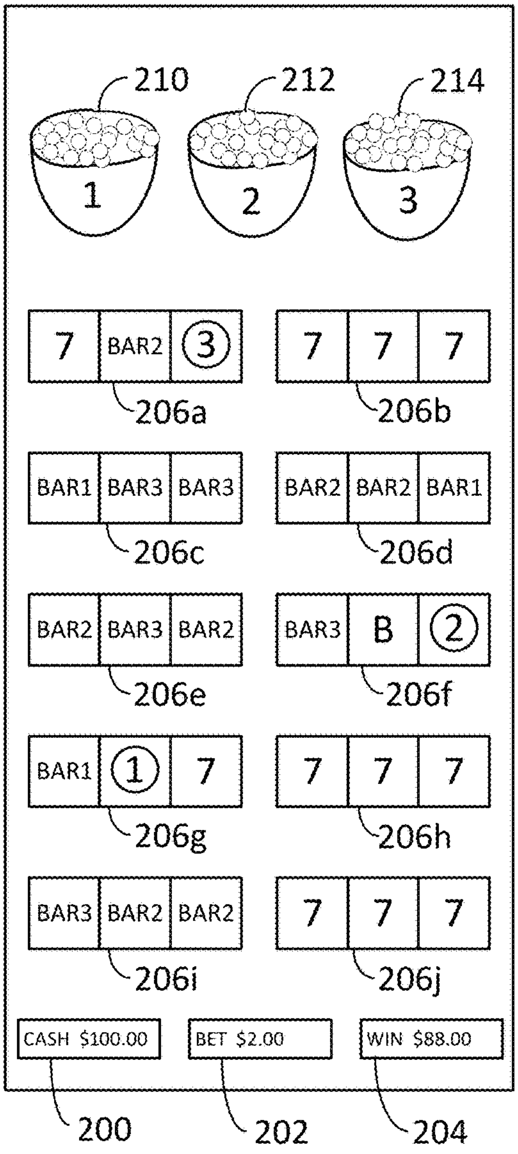
FIG. 5 is an exemplary presentation of a modified spin outcome resulting from a nudge feature triggered by the initial spin outcome.

In FIGS. 4 and 5, the presentation device depicts ten reel sets 206*a-j* (referred to generally as 206) arranged in five rows and two columns. Each reel set 206 includes three reels that populates an array having a single row of three symbol positions. Each symbol position is associated with a respective independent reel. The reels bear a plurality of symbols that may, for example, include blanks B; bar-type symbols BAR1, BAR2, and BAR3; a seven symbol 7; and three types of coin symbols ①, ②, and ③. The different types of coin symbols may be represented by numbers as shown, letters, colors, shapes, and/or other non-alphanumeric indicia.

At step 104, the game-logic circuitry detects, via a value input device, a physical item associated with a monetary value that establishes a monetary balance in the form of cash or credits. In FIGS. 4 and 5, the monetary balance may be shown on a meter 200.

At step 106, the game-logic circuitry initiates a wagering game cycle (i.e., spin cycle) in response to an input indicative of a wager covered by the monetary balance. To initiate a spin of the reels, the player may press a "Spin" or "Max Bet" key on a button panel or touch screen. In FIGS. 4 and 5, the wager may be shown on a bet meter 202.

At step 108, using an RNG, the game-logic circuitry spins and stops the sets of reels to randomly land symbols from the reels in the respective arrays in visual association with respective one or more paylines (also known as lines, ways, patterns, or arrangements). In other words, the arrays are populated with symbols from the respective reel sets, and the populated arrays represent respective symbol outcomes. The reel sets may be spun and stopped in parallel, in series, or in some combination thereof. In one embodiment, the reel sets commence spinning at the same time, then the reels in the respective reel sets successively stop in tandem from left to right such that the left reels in the reel sets stop first, the middle reels in the reel sets stop second, and the right reels in the reel sets stop third. In another embodiment, the reels commence spinning at the same time, and then the reel sets successively stop in a predetermined sequence based on their location on the presentation device. For example, if the ten reel sets 206 are arranged as shown in FIG. 4, the reel sets 206 may successively stop row-by-row starting from the top row (reel sets 206*a-b*) and ending with the bottom row (reel sets 206*i-j*). The reel sets 206 in each row may stop at the same time, from left to right, or from right to left. Or, the reel sets 206 may successively stop column-by-column starting with the left column (reel sets 206*a,c,e,g,i*) and ending with the right column (reel sets 206*b,d,f,h,j*). The reel sets 206 in each column may stop at the same time, from top to bottom, or from bottom to top. The stopping sequence may vary (randomly or in a predetermined manner) from one wagering game cycle to the next. The reel spin may be animated on a video display by depicting symbol-bearing strips moving vertically across the display and synchronously updating the symbols visible on each strip as the strip moves across the display. Alternatively, the reels may be physical/electromechanical reels. FIG. 4 depicts an example of initial spin outcomes as a result of spinning and stopping the ten reel sets 206.

At step 110, the game-logic circuitry awards standard payouts in accordance with a pay table. The pay table may, for example, include "line pays," "ways pays," and "scatter pays," as well as a payout (e.g., 2 times the player's wager) for each coin symbol ①, ②, and ③. Line pays occur when a predetermined type and number of symbols appear along an activated payline, typically in a particular order such as left to right, right to left, top to bottom, bottom to top, etc. Ways pays appear on adjacent reels without the requirement to be on a specified pay line or directly adjacent to one another. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. In FIGS. 4 and 5, each reel set 206 populates a row of three symbol positions associated with a single horizontal payline. The reel set 206*c* depicts a line pay of three bar-type symbols BAR1, BAR3, BAR3, while the reel sets 206*a*, 206*f*, and 206*g* depict coin symbol pays. The awarded pays are added to a win meter 204.

At step 112, the game-logic circuitry determines whether or not any coin symbols ①, ②, or ③ landed in the arrays populated by the respective reel sets. If no such coin symbols landed in the array, the game-logic circuitry ends the current wagering game cycle and immediately proceeds to step 120. If, however, one or more such coin symbols landed in the array as shown in FIG. 4, the game-logic circuitry proceeds to step 114. At step 114, the game-logic circuitry animates the addition of each coin symbol to the persistent element (e.g., coin pot) associated with that coin symbol. In FIG. 4, the coin symbols ①, ②, and ③ are associated with the respective coin pots 210, 212, and 214. The coin symbol ① is added to the coin pot 210. The coin symbol ② is added to the coin pot 212. The coin symbol ③ is added to the coin pot 214.

When animating the addition of a coin symbol to a coin pot, a copy of the coin symbol may appear to "fly" off its reel set (leaving the landed coin symbol on the reel set from which the copy originates) and land in the middle of the coin pot. To represent the addition of the coin symbol to the coin pot, the pot and/or the volume of coins therein may appear to grow in size. The persistent elements may take forms other than the coin pots 210, 212, 214, including for example money bags, piggy banks, urns, vases, jars, jugs, cans, bowls, beehives, inflating balloons, growing fish in fish bowls, ladders, dials, meters, etc. In accordance with some embodiments, the persistent element may be an object of fixed size accompanied by some other indication of accumulating value, for example, by a gradual change in color. In other embodiments, the persistent element may change size and also show some other indication of increasing value, for example, the color of the display in the immediate area of the persistent element may gradually change as its value increases.

During a player's gaming session, the growth in size of the coin pots 210, 212, 214 may persist from one wagering game spin cycle to the next such that the player perceives that the corresponding feature may be getting closer to being triggered. This kind of game is known as a "perceived persistence" game. Unlike a true "persistence game," wherein the size of each coin pot or the observable quantity of its contents serves as an indication of the probability that its associated bonus will be triggered. In both cases, when the feature associated with a pot is triggered, at least some of the contents of the pot are visually removed and the accumulation of coins in that pot during subsequent game spin cycles resumes from that point.

At step 116, for each coin symbol added to a respective coin pot, the game-logic circuitry randomly determines, via the RNG, whether or not to trigger a feature associated with the coin pot to which the coin symbol was added. This random determination is independent of any prior wagering game cycles. In FIG. 4, the RNG odds of triggering the feature associated with coin pot 210 may be 50/1000 for each coin symbol ① added to that coin pot 210; the RNG odds of triggering the feature associated with coin pot 212 may be 40/1000 for each coin symbol ② added to that coin pot 212; and the RNG odds of triggering the feature associated with coin pot 214 may be 30/1000 for each coin symbol ③ added to that coin pot 214. If no features are triggered at step 116, the game-logic circuitry ends the current wagering game cycle and immediately proceeds to step 120. If, however, one or more features are triggered at step 116, the game-logic circuitry proceeds to step 118 and conducts the triggered feature(s). In FIG. 4, the feature associated with coin pot 210 may be that any wins in the initial spin outcomes are multiplied by a random multiplier; the feature associated with coin pot 212 may be a series of free spins; and the feature associated with coin pot 214 may be a nudge feature described in detail below. If multiple features are triggered at step 116, the triggered features may be played together or in succession. If, for example, the features associated with both coin pots 210 and 212 are triggered, the game-logic circuitry may conduct a series of free spins in which any wins during the free spins are multiplied by a random multiplier.

In the example shown in FIGS. 4 and 5, the nudge feature associated with coin pot 214 is triggered and conducted. As a general matter, the nudge feature automatically converts losing (non-paying) reel sets 206 in FIG. 4 to winning (paying) reel sets in FIG. 5. The nudge operation changes the symbol outcome on a reel set from a loss to a win by incrementally shifting, stepping, or nudging one or more reels of the reel set up or down by one or more positions. FIG. 5 is an exemplary presentation of modified spin outcomes resulting from the nudge feature, which was randomly triggered when the coin symbol ③ in an initial spin outcome of FIG. 4 was added to coin pot 214. The game-logic circuitry operates the nudge feature according to a predetermined set of requirements which may, for example, include the following:

Nudge Direction: If each reel set 206 includes a left reel 1, a middle reel 2, and a right reel 3, then reels 1 and 3 can only nudge down and reel 2 can only nudge up.

Scenario #1: If two of the three positions bear blanks B, the reels showing the blanks B nudge until they reach a bar-type symbol (if the third position is a bar-type symbol) or a seven symbol (if the third position is a seven symbol). Representing this scenario, reel set 206*b* nudges from the two blanks B in FIG. 4 to seven symbols in FIG. 5, and reel set 206*e* nudges from the two blanks B in FIG. 4 to nearest bar-type symbols BAR3, BAR2 in FIG. 5.

Scenario #2: If one of the three positions bears a blank B and the other two positions bear other matching types of symbols (i.e., both bar-type symbols or both sevens 7's), then the reel showing the blank B nudges until it reaches the other matching types of symbols. Representing this scenario, reel set 206*d* nudges from the blank B in FIG. 4 to a bar-type symbol in FIG. 5.

Scenario #3: If one of the three positions bears a blank B and the other two positions bear different types of symbols (i.e., a bar-type symbol and a seven 7), then the game-logic circuitry randomly selects one of the following outcomes: (i) the reels showing the blank B and the seven 7 nudge to the nearest bar-type symbol, or (ii) the reels showing the blank B and the bar-type symbol nudge to the nearest seven 7. Representing this scenario, reel set 206*h* nudges from the blank B and BAR3 in FIG. 4 to sevens 7's in FIG. 5.

Scenario #4: If none of the three positions bear a blank B such that two positions bear a bar-type symbol or a seven 7, then the one reel showing the different type of symbol nudges to the nearest symbol of a type matching the type of the other two symbols. Representing this scenario, reel set 206*i* nudges from the BAR3, BAR2, 7 in FIG. 4 to BAR3, BAR2, BAR2 in FIG. 5.

Scenario #5: If all three positions bear blanks B, the game-logic circuitry determines what the reel set would display if each of the reels is nudged once (i.e., by one position) according to the "Nudge Direction" requirement referenced above and then follows the scenario associated with the nudged-once reels. Representing this scenario, reel set 206*j* nudges from the three blanks B in FIG. 4 to three 7's in FIG. 5 assuming the reels, when nudged once from the three blanks B in FIG. 4, would display two sevens 7's and one bar-type symbol.

During the nudge feature, the game-logic circuitry directs the presentation device to exhibit animations that enhance the feature. For example, while the nudge feature is active, the coin pot 214 that initiated the nudge feature may exhibit a color change, size change, highlighted border, pulsing animation, flashing animation, or other distinguishing characteristic. Special effects (e.g., fire, lightning, sparkles, lasers, etc.) may be shot from the coin pot 214 to each losing reel set sequentially to appear to cause the losing reel set to nudge from a losing outcome to a winning outcome. The losing reel set is highlighted with an effects animation until the nudge is completed with respect to that reel set.

In FIGS. 4 and 5, the nudge feature does not apply the nudge operation to reel sets 206*a*, 206*c*, 206*f*, or 206*g* because these four reel sets exhibited wins (pays) in the initial spin outcomes in FIG. 4. Only the reel sets 206*b*, 206*d*, 206*e*, 206*h*, 206*i*, and 206*j* exhibited losses (no pays)

in the initial spin outcomes and thus are nudged to wins during the nudge feature. In another embodiment, instead of nudging the losing reel sets to wins, each losing reel set is fully respun until it exhibits a winning outcome. In a further embodiment, one or more reels of each losing reel set may be held in place while the remaining reel(s) of the losing reel set are respun until the reel set exhibits a winning outcome. Because blanks B cannot contribute to a winning outcome in the embodiments disclosed herein, the reel(s) held in place would not include any reel that displays a blank B.

Returning to FIG. 3, after conducting the triggered feature (s) at step 118, the game-logic circuitry ends the current wagering game cycle and proceeds to step 120. At step 120, the game-logic circuitry determines whether or not it has received a cashout input via at least one of the one or more player input devices of the gaming machine. If it has not received a cashout input, the game-logic circuitry waits for the next wager input at step 106. If it has received a cashout input, the game-logic circuitry initiates a payout from the monetary balance on the meter 200 in FIGS. 4-5 via a value output device. The data processing method then ends at step 122.

The recitations of a value input device for establishing a monetary balance, an input device for accepting a wager input that initiates a spin, and a value output device for paying out the monetary balance are integrally incorporated within the steps of the data processing method. For example, the presentation of game outcomes through the spinning and stopping of the reels is essential to the game outcome determinations, which may only be initiated by the accepted wager input. Furthermore, a value input device for establishing a monetary balance, an input device for accepting a wager that initiates a spin, and a value output device for paying out the monetary balance are physical, structural elements that are not shared by generic or well-known computing devices but, rather, are particular to gaming machines.

Embodiments of the present invention realize benefits in increased computer processing efficiency with minimized processing overhead, fewer rules to be evaluated, fewer player inputs to be monitored, and simpler graphical representations. With respect to the feature triggering process, if no coin symbols appear in the array at step 112, the game-logic circuitry foregoes any random determination of whether a feature will be triggered. And if, for example, the nudge feature is triggered, the game-logic circuitry follows a simple set of rules for determining how the reel sets that exhibited losing outcomes are nudged to display winning outcomes. In contrast, in typical prior art systems with mystery bonus triggers, the game-logic circuitry makes a random determination in each and every wagering game cycle and for each and every feature that may be won. And if one or more features are won, the features typically involve complex rules and/or multiple RNG determinations. This reduces processing efficiency compared to the method presented herein.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the gaming machine including a gaming cabinet and game-logic circuitry secured within a locked box inside the gaming cabinet, the game-logic circuitry including memory storing programming for a random number generator (RNG) and a wagering game that determines game outcomes, the method comprising the operations of:

prior to executing the wagering me, executing an authentication program on the gaming machine to authenticate at least the RNG programming and the wagering-game programming that determines game outcomes, wherein executing the authentication program comprises generating a live authentication code derived from contents of the memory and comparing the live authentication code to a trusted code stored in the memory, and permitting execution of the RNG programming and the wagering-programming only upon a match;

accepting, via a value input device, a physical item associated with a monetary value to establish a monetary balance;

recording, in the memory, stored data indicative of the monetary balance;

displaying, by a present assembly, a plurality of reel sets of symbol-bearing reels, wherein the plurality of reel sets include at least five reel sets, and wherein each reel set includes three reels;

using, by the game-logic circuitry, the RNG programming to generate a randomly-determined outcome that identifies, for each of the plurality of reel sets, symbols for occupying three symbol positions of a respective array, the three symbol positions of the respective array being associated with a single payline;

spinning and stopping the plurality of reel sets, based on the randomly-determined outcome, to populate the respective arrays with the symbols from the respective reel sets, the populated arrays representing respective symbol outcomes;

updating, by the game logic circuitry and in the memory and based on the randomly-determined outcome, the stored data to indicate the symbols for the respective arrays and the respective symbol outcomes;

in response to a triggering event, conducting, by the game-logic circuitry, a nudging feature, the nudging feature including nudging one or more reels of any of the reel sets that populated its respective array with a losing symbol outcome to convert the losing symbol outcome to a winning symbol outcome, wherein conducting the nudging feature includes determining, according to a predetermined set of requirements indicating how to nudge each reel based on the symbols in the losing symbol outcome, a nudge direction for each of one or more reels to be nudged, successively animating at least one reel set that is converted from the losing symbol outcome to the winning symbol outcome, and nudging each of the one or more reels by at least one symbol position in the nudge direction to convert the losing symbol outcome to the winning symbol outcome; and presenting, by the presentation assembly, an award for each winning symbol outcomes.

2. The method of claim 1, wherein the displaying operation includes displaying a persistent element, and further including in response to at least one of the arrays being populated with an accumulation symbol, animating an addition of the accumulation symbol to the persistent element, and wherein the game-logic circuitry, using a random number generator, randomly triggers the nudge feature in response to the addition.

3. The method of claim 2, wherein the animating operation includes providing a visual indication of accumulating value at the persistent element to which the accumulation symbol is added.

4. The method of claim 1, wherein the plurality of reels in each reel set are electromechanical reels.

5. The method of claim 1, wherein the conducting operation includes successively animating the reel sets that are converted from the losing symbol outcome to the winning symbol outcome.

6. A gaming machine comprising:

a gaming cabinet;

a value input device configured to accept a physical item associated with a monetary value to establish a monetary balance;

a presentation assembly configured to display a plurality of reel sets of symbol-bearing reels; and game-logic circuitry secured within a locked box inside the gaming cabinet, the game-logic circuitry including memory storing programming for a random number generator (RNG) and a wagering game that determines game outcomes, and configured to perform the operations of:

prior to executing the wagering game, executing an authentication program to authenticate at least the RNG programming and the wagering-game programming that determines game outcomes, wherein executing the authentication program comprises generating a live authentication code derived from contents of the memory and comparing the live authentication code to a trusted code stored in the memory, and permitting execution of the RNG programming and the wagering-game programming only upon a match;

recording, in the memory, stored data indicative of the monetary balance;

using the RNG, generating a randomly-determined outcome that identifies, for each of the plurality of reel sets, symbols for occupying three symbol positions of a respective array, the three symbol positions of the respective array being associated with a single payline, wherein the plurality of reel sets include at least five reel sets, and wherein each reel set includes three reels;

spinning and stopping the plurality of reel sets, based on the randomly-determined outcome, to populate the respective arrays with the symbols from the respective reel sets, the populated arrays representing respective symbol outcomes;

updating, by the game-logic circuitry and in the memory and based on the randomly-determined outcome, the stored data to indicate the symbols for the respective arrays and the respective symbol outcomes;

in response to a triggering event, conducting a nudging feature including nudging one or more reels of any of the reel sets that populated its respective array with a losing symbol outcome to convert the losing symbol outcome to a winning symbol outcome, wherein conducting the nudging feature includes determining, according to a predetermined set of requirements indicating how to nudge each reel based on the symbols in the losing symbol outcome, a nudge direction for each of one or more reels to be nudged, successively animating at least one reel set that is converted from the losing symbol outcome to the winning symbol outcome, and nudging each of the one or more reels by at least one symbol position in the nudge direction to convert the losing symbol outcome to a winning symbol outcome; and directing the presentation assembly to present an award for each winning symbol outcome.

7. The gaming machine of claim 6, wherein the presentation assembly is configured to display a persistent element, and further including in response to at least one of the arrays being populated with an accumulation symbol, the game-logic circuitry is configured to direct the presentation assembly to animate an addition of the accumulation symbol to the persistent element and randomly trigger the nudge feature in response to the addition.

8. The gaming machine of claim 7, wherein the game-logic circuitry is configured to direct the presentation assembly to provide a visual indication of accumulating value at the persistent element to which the accumulation symbol is added.

9. The gaming machine of claim 6, wherein the plurality of reels in each reel set are electromechanical reels.

10. The gaming machine of claim 6, wherein the conducting operation includes successively animating the reel sets that are converted from the losing symbol outcome to the winning symbol outcome.

* * * * *